(12) United States Patent
Tong et al.

(10) Patent No.: US 6,498,408 B2
(45) Date of Patent: Dec. 24, 2002

(54) HEAT TRANSFER ENHANCEMENT AT GENERATOR STATOR CORE SPACE BLOCKS

(75) Inventors: Wei Tong, Clifton Park, NY (US); Zhang Qing Zhuo, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 6 days.

(21) Appl. No.: 09/740,008

(22) Filed: Dec. 20, 2000

(65) Prior Publication Data

US 2002/0074874 A1 Jun. 20, 2002

(51) Int. Cl.$^7$ .......................... H02K 1/32; H02K 15/02
(52) U.S. Cl. ........................ 310/65; 310/60 A
(58) Field of Search .............................. 310/52, 58, 59, 310/54, 65, 64, 61, 62, 60 A, 216, 42; 29/596–598

(56) References Cited

U.S. PATENT DOCUMENTS

| | | | | |
|---|---|---|---|---|
| 649,574 A | * | 5/1900 | Foshag | 310/65 |
| 2,381,297 A | * | 8/1945 | Lynn | 310/65 |
| 2,618,756 A | * | 11/1952 | Fechheimer | 310/65 |
| 3,597,645 A | * | 8/1971 | Duffert et al. | 310/65 |
| 4,028,569 A | * | 6/1977 | Towne | 310/64 |
| 4,362,960 A | | 12/1982 | Gillet | 310/65 |
| 5,814,910 A | * | 9/1998 | Pelletier | 310/65 |
| 5,869,912 A | | 2/1999 | Andrew et al. | 310/52 |

OTHER PUBLICATIONS

Co–pending U.S. patent application Ser. No. 09/421,160, Generator Stator Core Vent Duct Spacer Posts, filed Oct. 19, 1999.

* cited by examiner

Primary Examiner—Tran Nguyen
(74) Attorney, Agent, or Firm—Banner & Witcoff, LTD (57) ABSTRACT

A ventilation pathway for a cooling gas to flow extends on a radial axis in a generator stator core. The ventilation pathway comprises at least two magnetic laminations and a plurality of space blocks extending radially in the generator stator core. The space blocks are fastened and disposed between the magnetic laminations. At least one of the space blocks includes a wavy longitudinal profile that includes an alternating pattern of peaks and valleys with respect to the radial axis of the generator stator core. Alternatively, at least one of the space blocks has a plurality of protrusions defining a pattern of peaks and valleys extending from a sidewall of the space block. Several different shapes of vortex generators are punched in the lamination are located within the ventilation pathway.

25 Claims, 9 Drawing Sheets

HEAT TRANSFER ENHANCEMENT AT GENERATOR STATOR CORE SPACE BLOCKS

BACKGROUND OF THE INVENTION

The present invention relates to a generator stator core, more particularly, to a ventilation duct disposed between magnetic laminations of a generator stator core.

The stator core becomes hot during operation of the electric generator and the heat must be removed to keep it from overheating. Cooling the generator stator core is important for reliable generator performance. In the conventional cooling method, the steel core is cooled by a forced-convection flow of air or hydrogen gas via radial space blocks and cooling channels. In general, hot spots usually appear near the tooth tips of the lamination. Conventionally, the gas smoothly flows inside of the cooling channels to remove heat. These space blocks are positioned in such a way to assure tightness of the core during assembly and operation, and not impede or restrict the flow of gas through the stator.

Figure 1:
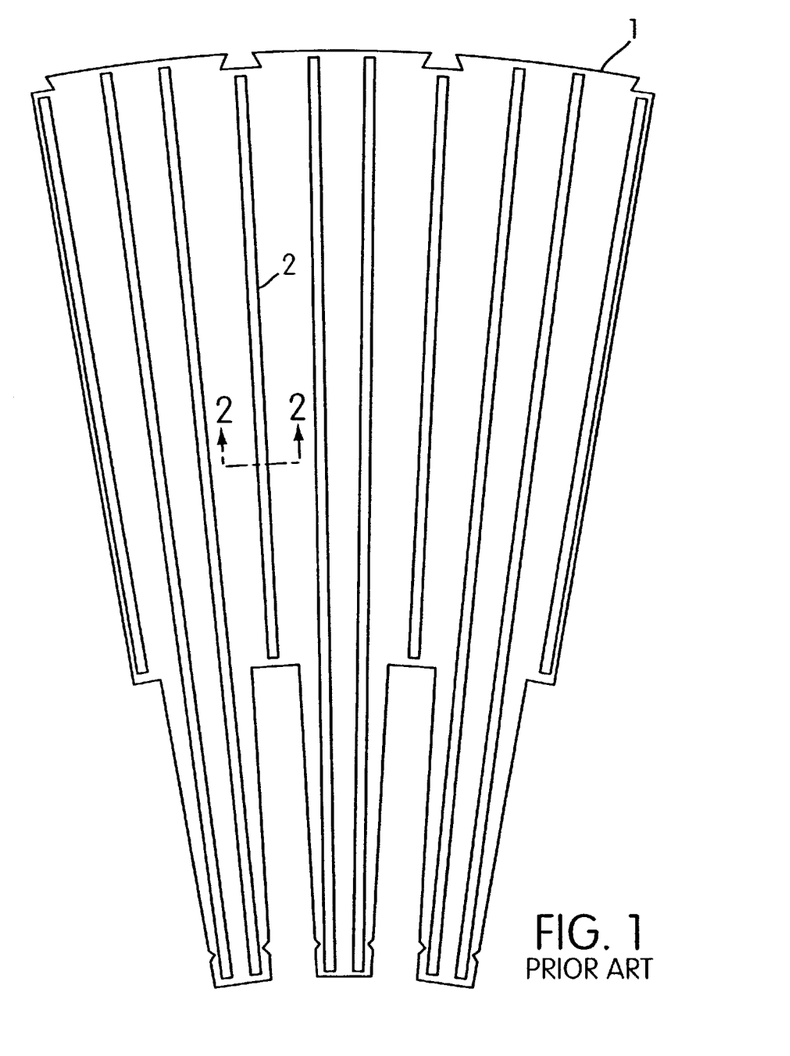
FIG. 1 is a side elevational view of a conventional generator stator lamination and inside space blocks.

A generator stator core is constructed by stacking layers or "laminations" of insulated silicon-iron metal disks together. Inside space blocks or rails are inserted between the layers of the metal disk and these space blocks extend radially from the center of the core. The functions of the inside space blocks are to provide a ventilation passage for a cooling gas and to transfer the load due to axial stacking pressure of the laminators. The space blocks are spaced at regular intervals around the circumference of each metal disk. On a conventional strator lamination 1 of arcuate shape, inside space blocks 2 are typically arranged radially and have a cross-section or profile resembling small I-beams. These I-beam shaped space blocks are spot welded to stator lamination 1 shown in FIGS. 1 and 2. The space blocks are made from one of several materials such as low carbon steel, silicon-manganese bronze, or stainless steel.

Several attempts for enhancing local heat transfer and reducing hot spot temperature in the stator core were made previously. The following patents and applications are hereby incorporated by reference. U.S. Pat. No. 5,869,912 "Direct-Cooled Dynamoelectric Machine Stator Core with Enhanced Heat Transfer Capability" discloses the use of a turbulator element in ventilation ducts. The spacer blocks have a straight longitudinal profile. Commonly-assigned, co-pending U.S. patent application Ser. No. 09/421,160, filed on Oct. 19, 1999 discloses the use of cylindrical compact posts to maximize the flow area for the cooling gas. U.S. Pat. No. 4,362,960 "Spacer Assembly for a Stator Venting Duct of an Electric Power Machine," discloses slightly curved spacer members having a rectangular profile. While all of these prior art attempts do alleviate the hot spot problems to some extent, the conventional space block shapes and the straight radial configurations do not take maximum advantage of heat transfer principles. Since the search is always on for improved generator performance, there is a particular need to enhance the heat transfer in a generator stator core.

BRIEF SUMMARY OF THE INVENTION

The present invention provides several structural advantages for improving heat transfer along a generator strator core. The various embodiments are based on two fundamental heat transfer principles: imparting turbulence to the cooling flow and increasing surface area. One way that enhanced cooling is achieved is in the arrangement of the space blocks. In general, the space blocks which the prior art arranged in more or less straight lines are configured, in the present invention, in undulating arrangements such as a zigzag or a sinusoidal pattern. These configurations force the cooling gas to change direction as it makes its way through the ventilation pathway. This disturbance in the flow enhances the cooling of the strator core. Another way to enhance cooling is to change the cross-sectional shape of the space blocks to provide more surface area to promote heat transfer. These two main principles are applied in various permutations to optimize the cooling effect of the cooling gas.

More specifically, according to one aspect of the present invention, at least one space block includes a wavy longitudinal profile of a generator stator core. Thus, the cooling gas is influenced to periodically change its direction along the flow path adjacent to the longitudinal profile.

According to another aspect of the present invention, a plurality of vortex generators can be applied in a generator stator core for cooling by punching a plurality of delta-shaped, wedge-shaped, or hemispherical protrusions on laminations. Thus the vortex generator impart turbulence to the cooling flow.

According to another aspect of the present invention, a generator stator core comprises at least one space block including a plurality of thermal fins extending from a side surface of the space block. Thus, the heat transfer surface is increased for the side surface of the space block.

The present invention is advantageous for augmenting the heat transfer for a generator stator core by increasing the cooling capacity at the stator core. Localized hot spots are greatly reduced by the invention. The generator output rating is increased because the stator temperature is controlled at the lower temperature than conventional cooling systems.

These features and advantages of the present invention will be apparent upon consideration of the following detailed description thereof, presented in connection with the following drawings in, which like reference numerals identifying the elements throughout.

DETAILED DESCRIPTION OF THE INVENTION

Referring to FIGS. 3–6, a number of exemplary embodiments of the invention are illustrated. In all of the figures, a plurality of ventilation pathways or cooling channels 10 are disposed on a generator stator core lamination 12. A plurality of inside space blocks 14 extend radially from the center of the stator core and the space blocks are inserted between laminations 12. The longitudinal and cross sectional profile of inside space blocks 14 are designed to increase heat removal from the stator core. In addition, a plurality of vortex generators 16 are disposed within or inside of the cooling channels. A cooling gas, such as air or hydrogen, is injected into the cooling channels 10 to remove the heat created in the stator core. The space blocks are generally separated at regular intervals around the circumference of lamination 12. The cooling channels are defined by the interior space disposed between at least two adjacent space blocks 14 inserted between at axially adjacent stacked laminations 12. The embodiments of the present invention provide three-dimensional flow disturbance elements within the cooling channel to disrupt the gas flow near the interior surfaces. Through the use of computation fluid mechanics, the results demonstrate that the overall heat transfer coefficient from the gas flow can be doubled or tripled with these designs. Thus, the generator stator core can be ventilated more efficiently than conventional designs.

One way that the present invention achieves enhanced heat transfer as confirmed with computational fluid mechanics is to impart disturbances to the flow. In the exemplary embodiments shown in FIGS. 3–6, the flow of the cooling gas is disrupted where the cooling gas flows proximate to the inside surface of the cooling channel, e.g. the side surface 18 of the space blocks and the surface 20 of the laminations. Each space block 14 has a longitudinal profile being defined by a function that creates an alternating pattern of peaks and valleys with respect to a radial axis or the radial direction of the generator stator core.

Figure 3:
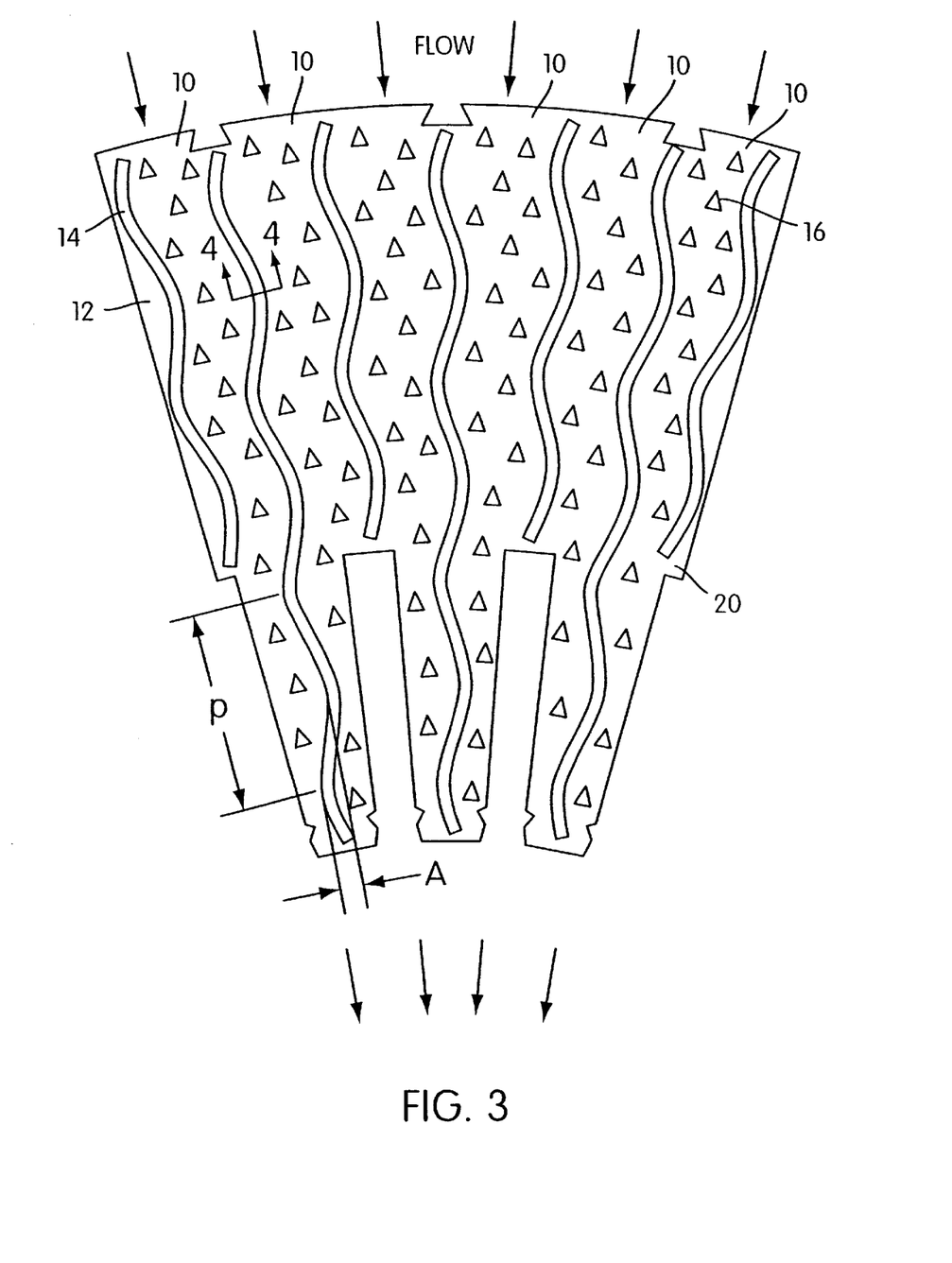
FIG. 3 is a side elevational view of an exemplary embodiment of a stator core lamination assembly with undulating space blocks and vortex generators.
Figure 5A:
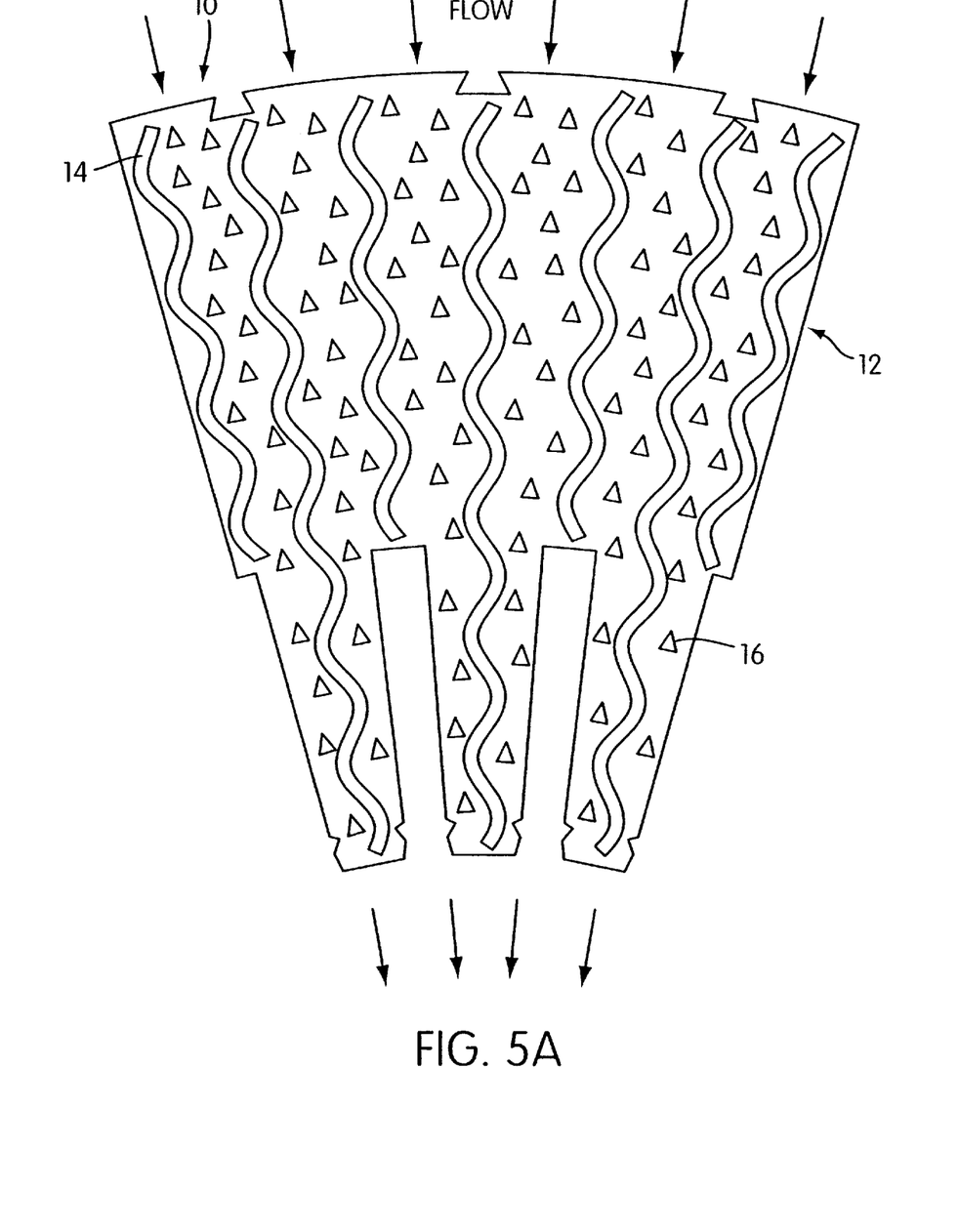
FIGS. 5A–5B are side elevational views of additional exemplary embodiments of the stator core lamination assembly.
Figure 5B:
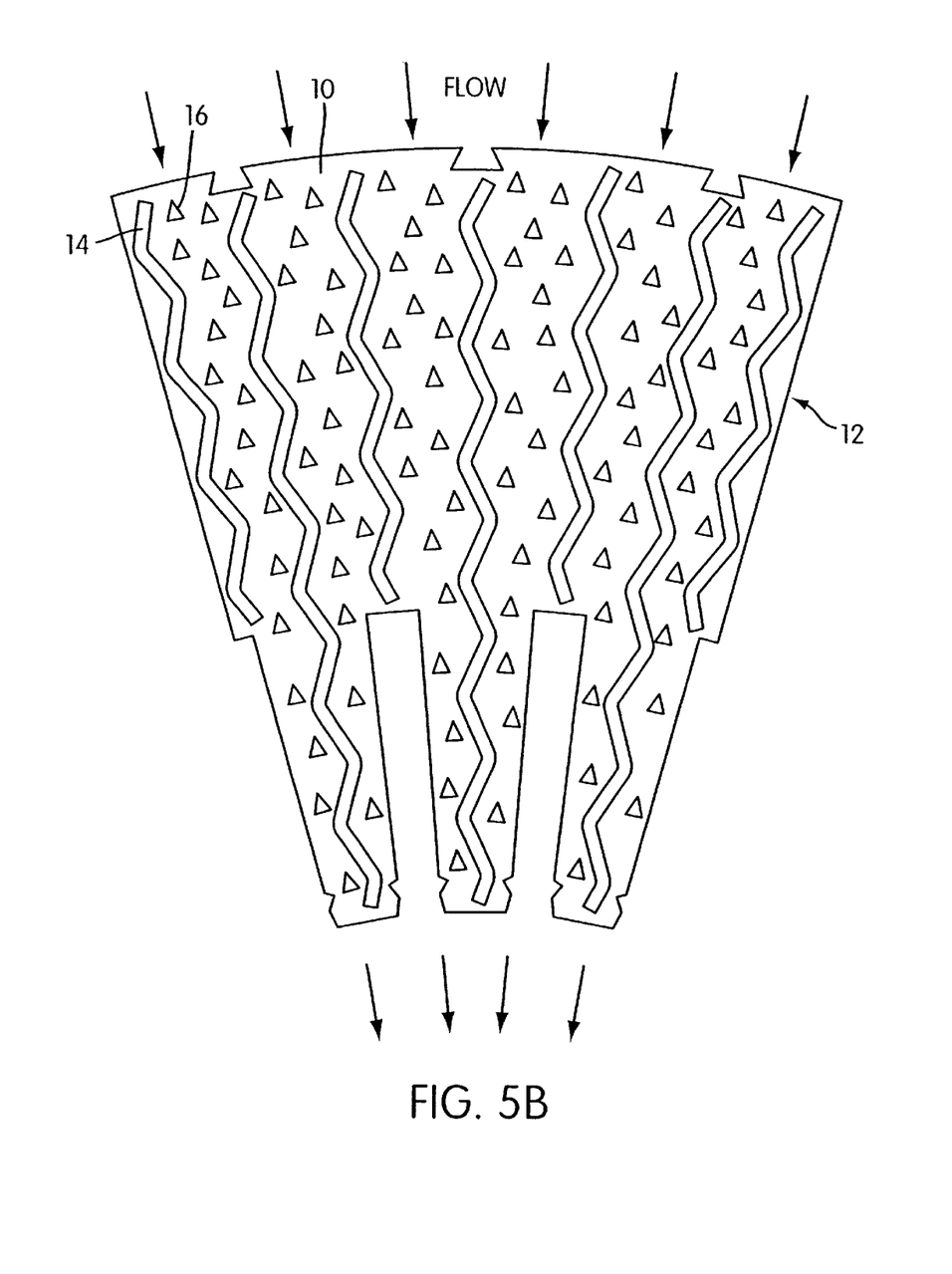

Referring to the embodiments illustrated in FIGS. 3 and 5, due to the undulations of the space block, the cooling gas is influenced to periodically change its direction along the flow path adjacent to longitudinal side surface 18 of space blocks 14. This causes local flow separation disturbances and subsequent reattachment of gas flow in the boundary layer. In addition, the redeveloping boundary layer from the reattachment point also contributes to heat transfer enhancement. In this way, the disturbances in the cooling gas flow by the longitudinal side surface advantageously reduces the thickness of the boundary layer and as a consequence, increases the effective heat transfer coefficient. Thus, additional heat is removed from the generator stator core.

FIG. 3 illustrates a longitudinal profile of an exemplary embodiment of space blocks 14. Space blocks 14 have a wavy type of longitudinal profile. One wavy type can be defined by a sinusoidal function. This longitudinal profile can be expressed as $y=A \sin(\omega x)$, where y is height of the profile with respect to an axis that is perpendicular to the radial direction; x is a reference dimensional point in the radial direction, A is a user selectable amplitude parameter of the profile, and $\omega$ is a user selectable angular frequency parameter. In addition, the distance between alternative valleys or peaks can be defined as $p=2\pi/\omega$. It should be appreciated that the aforementioned amplitude parameter A, and angular frequency parameter $\omega$ can be optimized accordingly by one skilled in the art for the characteristics of the intended generator stator core. The present invention is not limited to a sine function as illustrated, but other functions such as, a cosine function or an equation involving sine and cosine or equivalents thereof may be employed.

Variations of alternative wavy types of longitudinal profiles are illustrated in the exemplary embodiments shown in FIGS. 5A and 5B. In these embodiments, the profile performs the same purposes as previously explained for the embodiment shown in FIG. 3. Now referring FIG. 5A, the longitudinal profile of inside space blocks 14 can also have a small angular frequency. Thus, the number of peaks and valleys can be controlled for the specific desired amount of heat removal. Alternatively, as shown in FIG. 5B, the longitudinal profile of the space blocks is not limited to a wavy or sinusoidal shape, but may have a more pronounced alternating valley and peak arrangement such as a zig-zag pattern. Here the peaks and valleys are rounded corners.

Figure 6A:
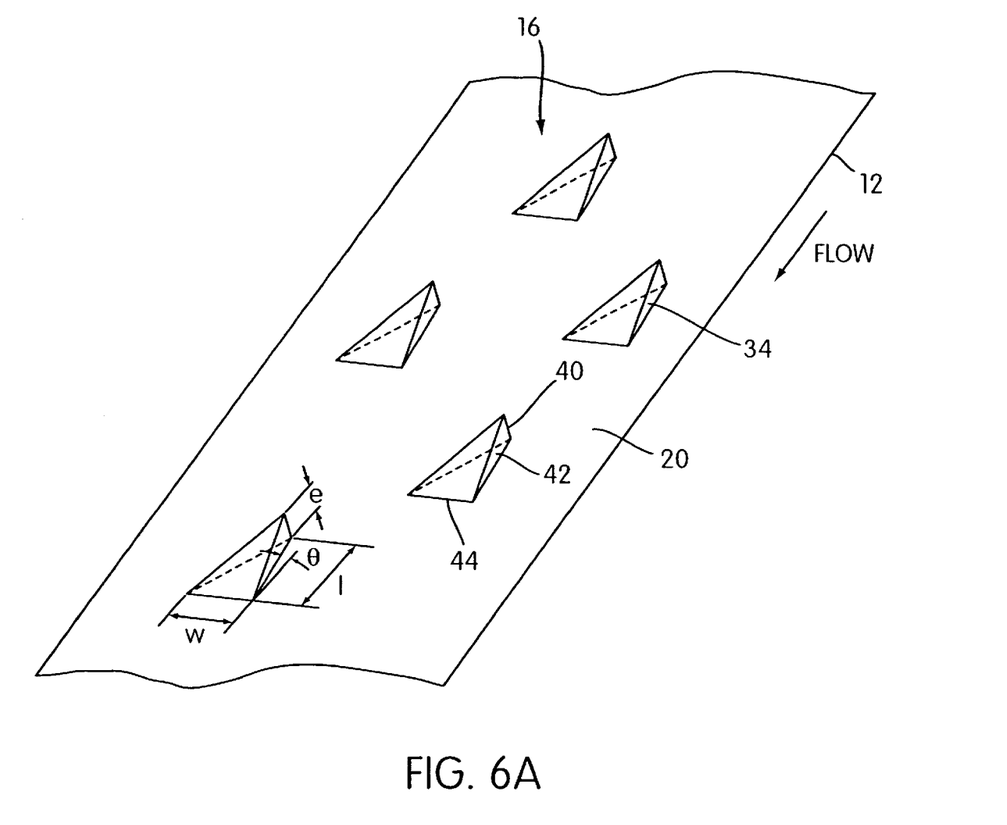
FIGS. 6A–6C are perspective views of exemplary embodiments of the vortex generators.
Figure 6B:
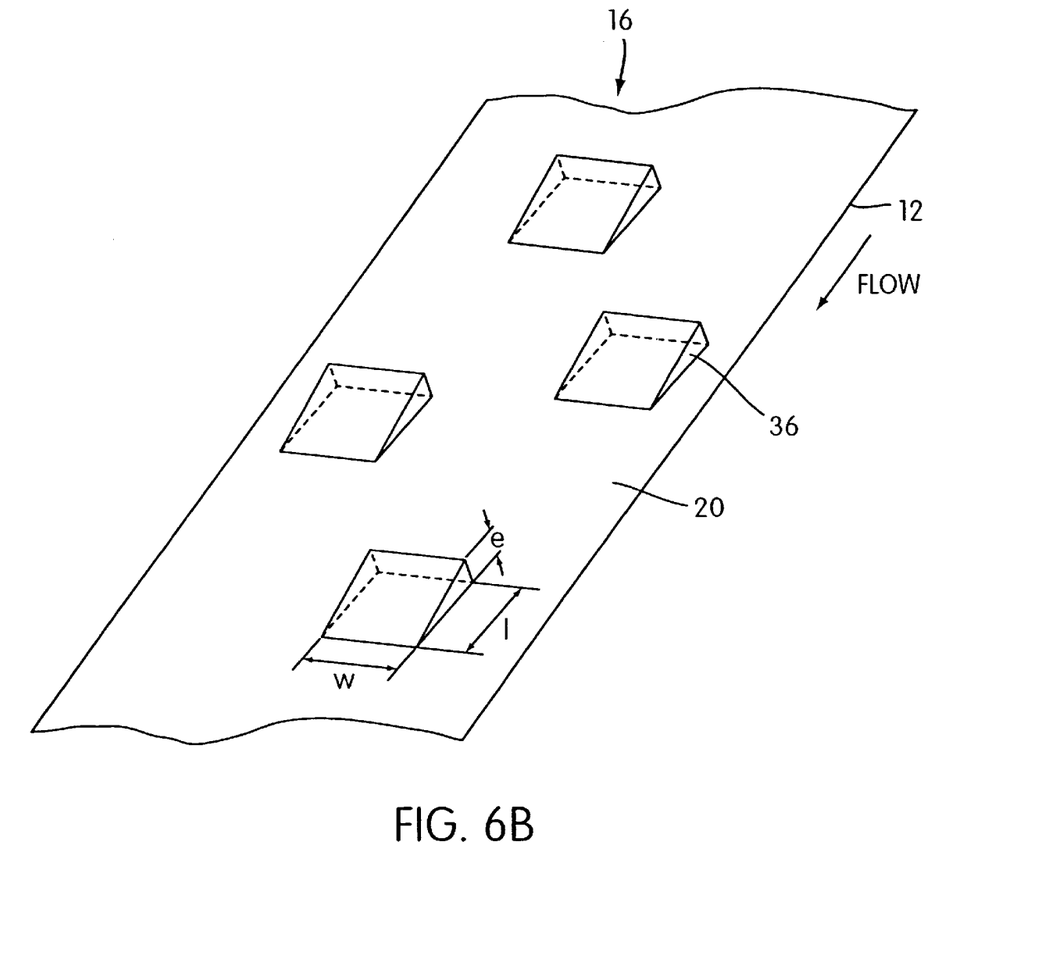
Figure 6C:
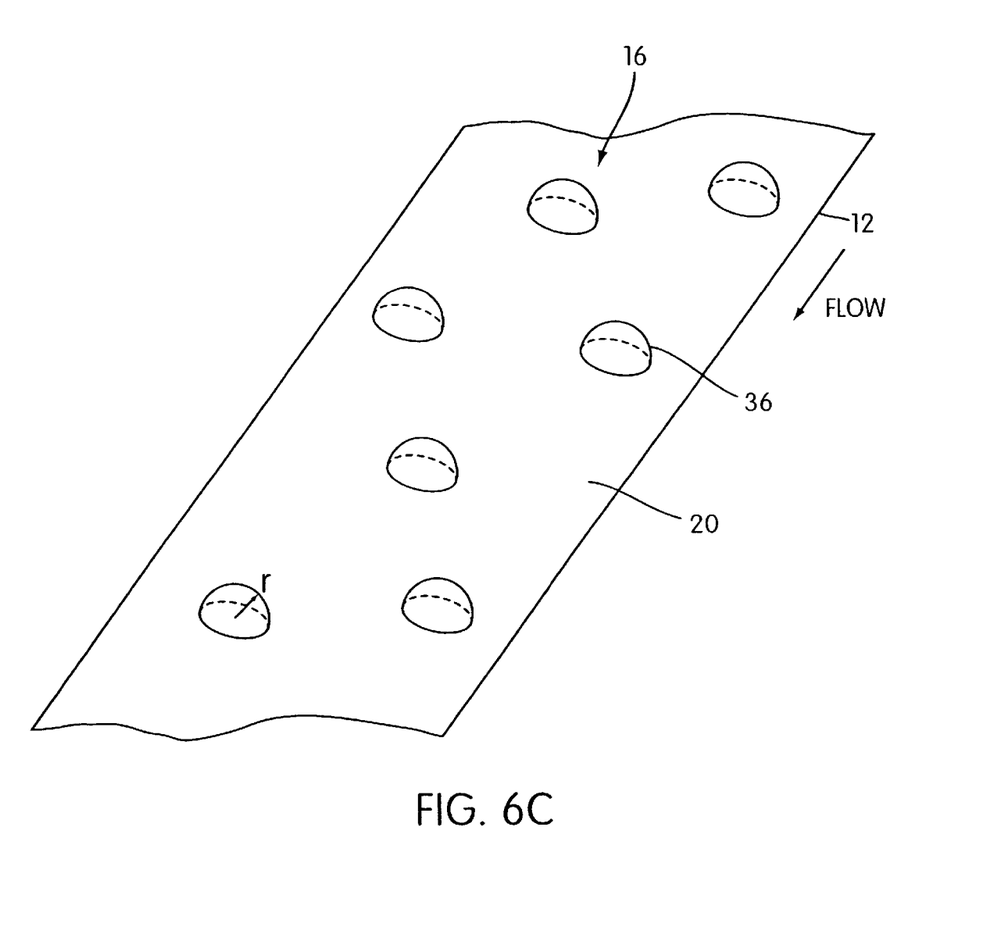

Another way of imparting disturbances to the flow is to employ vortex generators 16 in combination with the wavy space blocks. Referring the FIGS. 6A–6C, three types of exemplary vortex generators or turbulence promoters are shown. A plurality of delta-shaped protrusions 34 are illustrated in FIG. 6A, wedge-shaped protrusions 36 are shown in FIG. 6B, and hemisphere-shape protrusions 38 are shown in FIG. 6C. The vortex generators can be applied in a generator stator core for cooling by punching a plurality of delta-shaped, wedge-shaped, or hemispherical protrusions on laminations 12. In operation, as the cooling gas flows over these protrusions, a number of vortices are generated either at the sides of the protrusions, for delta-shaped protrusions, or at the front of the ribs, for wedge-shaped protrusions, and the flow separates in the wake of the protrusions. The vortex generation and propagation highly disturbs the cooling gas boundary layer and greatly enhances the surface heat transfer coefficient in relation to the lamination. The experimental results have shown that the interference between the protrusions plays an important role in the thermal and flow fields.

Referring to FIG. 6A, each delta-shaped protrusion comprises a leading edge 40, a body 42, a trailing edge 44. The body of each delta-shaped protrusion is characterized by a protrusion height e, a width w, a length l, and a delta angle $\theta$. Leading edge 40 is defined by protrusion height e is located at the apex of the delta-shape protrusion. Trailing edge 44 is disposed at the base of the delta-shape. Each delta-shaped protrusion is oriented against the flow direction so that heat transfer to the cooling gas is enhanced. Leading edge 40 meets and separates the cooling gas flow so not to create a relatively high-pressure drop. The orientation can be considered a backwards flow direction instead of a forward flow direction.

Referring to FIG. 6B, the wedge-shaped protrusion is characterized by rib height e, width w, and length l. Referring to FIG. 6C, the hemispherical protrusion is defined by radius r. It should be appreciated that the aforementioned protrusion height e, width w, length l, delta angle $\theta$ and radius r can be varied accordingly for the characteristics of the intended generator stator core. It has been determined that delta-shaped protrusions 34 produce a higher heat transfer augmentation and lower pressure drop penalty that of the wedge-shaped protrusions.

A significant pressure drop penalty is caused when sequential vortex generators are aligned along a radial axis in the direction of the cooling flow. In the embodiments illustrated, the pressure drop penalty is reduced by staggering rows of the ribs on the lamination. The desired number of vortex generators on the lamination depends upon a proportionate function between the heat transfer enhancement and introduced pressure drop. Thus, the desired amount of heat removal can be controlled.

Figure 4A:
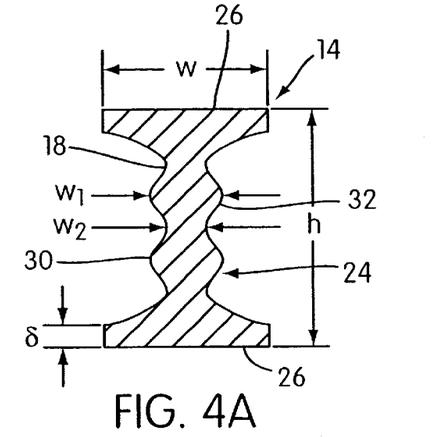
FIGS. 4A–4E are sectional views of exemplary embodiments of a space block of FIG. 3 having a profile taken along section line 4—4.
Figure 4B:
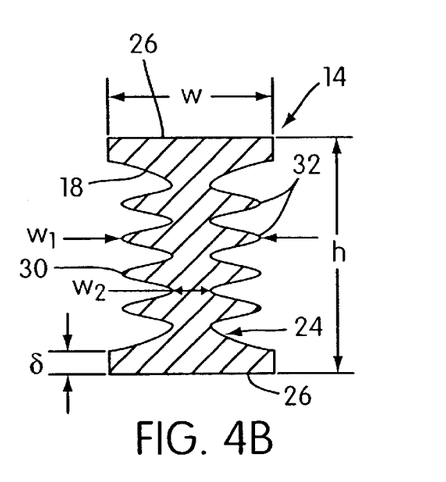
Figure 4C:
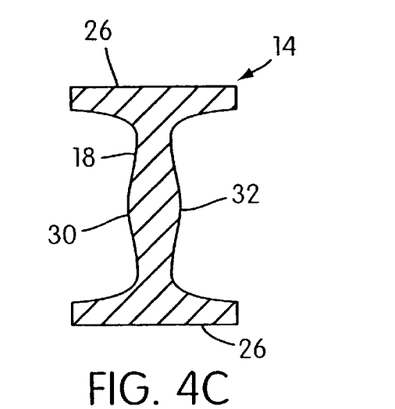

Another way of enhancing heat transfer is to increase the surface area of space blocks exposed to the cooling gas. FIGS. 4A–4C illustrates, exemplary embodiments of symmetric profiles of space blocks 14. As the cooling gas flows through cooling channels 10, a convective contact area 22 of the space blocks functions as heat transfer surfaces and act as thermal fins. Convective contact area is herein defined as the surface area of the space block that is used for heat transfer. It should be appreciated that surface area may be calculated by using the peripheral longitudinal length of the space block multiplied by the peripheral measurement of the sidewall. It has been determine by computational fluid dynamic analysis that the symmetric profiles shown in FIGS. 4A–4C, can increase heat transfer by about 5–20%, when compare to the conventional space block design shown in FIG. 2.

Each space block comprises a web member 24, two opposing flanges 26 being substantially parallel, an axis 28 extending between the flanges 26, and angle of inclination ψ. The angle of inclination is measured relative to the axis 28 and at least one of the opposing flanges 26. Web member 24 includes two opposing sidewalls 30 extending between the opposing flanges and configured substantially perpendicular. The width and thickness of the opposing flanges are defined by w and δ, respectively. Sidewalls 30 includes a plurality of thermal extensions 32 for transferring heat to a cooling gas. Thermal extensions 32 are defined by a plurality of protrusions that create a pattern of peaks and valleys on the sidewalls. As can be seen in FIGS. 4A and 4B, a peak on the sidewalls may be defined a protrusion having width in web member 24 defined by $w_1$, and valley is may be defined by the width in the web member defined by $w_2$, where $w_1$ is greater than $w_2$.

Figure 2:
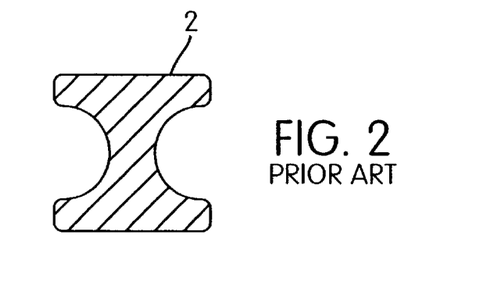
FIG. 2 is a sectional view of a conventional inside space block taken along line 2—2.

In the embodiments shown, the convective contact area on the sidewalls of the web member is varied for the desired amount of heat transfer. For symmetric space blocks, the heat transfer coefficient increases from FIGS. 4A to 4B, due to the increased convective contact area between the flowing cooling gas and the space block 14. The present invention advantageously increases the convective contact area for heat transfer over conventional space blocks such as shown in FIG. 2. In addition, the convective contact area can be increased by creating a single thermal extension in sidewall of the space block embodiment shown in FIG. 4C. The concept of creating a plurality of thermal extensions as shown in FIGS. 4A and 4B create yet a greater amount of convective contact area. It should be noted that the embodiment of space block 14 shown in FIG. 4B has the greatest convective contact area in the sidewalls and also the greatest amount of heat transfer efficiency.

Figure 4D:
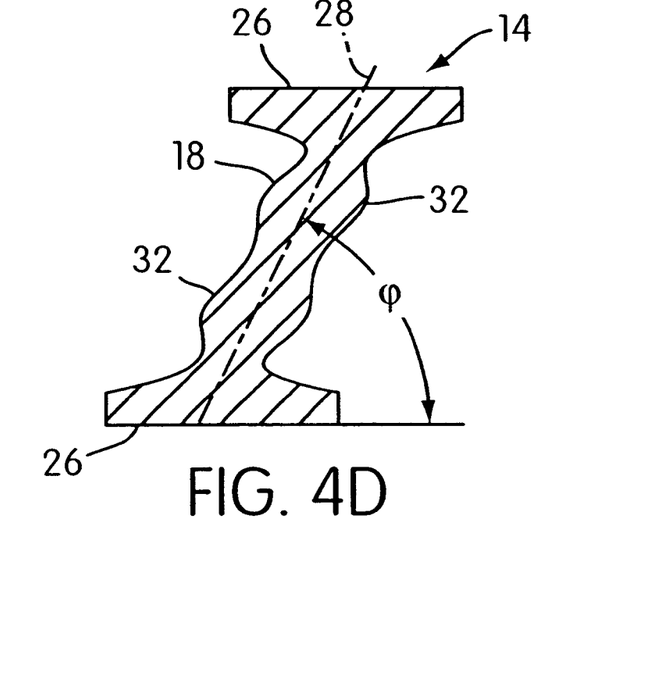
Figure 4E:
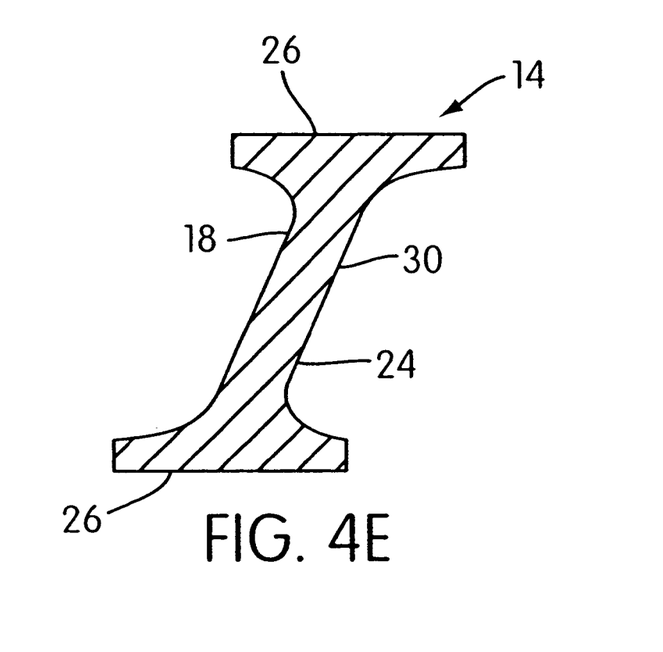

FIGS. 4D and 4E illustrate exemplary embodiments of asymmetric profiles of the space blocks. The embodiment shown in FIG. 4D is similar to the embodiment shown in FIG. 4A, except the angle of inclination is less than 90 degrees. Accordingly, thermal extensions 32 are included on the sidewalls of the space block. Alternatively, the embodiment shown is FIG. 4E does not include thermal extensions. Accordingly, the asymmetric profile of the space blocks shown in FIG. 4D is preferable over the embodiment shown in FIG. 4E. While, symmetric fins generally perform better than asymmetrical fins, it has been determined that if the thermal extensions are spaced far apart, asymmetric block profiles result in enhanced performance over symmetrical space block. This is mainly due to the larger extension of the convective contact area between solid and liquid in the cooling gas. It is recognized that the space blocks also function as support members between the laminations. Accordingly, the determination of the space block angle of inclination ψ varies as a function of a portion between the magnitude of heat transfer desired and the resultant bending stresses on both the space blocks and lamination. In the exemplary embodiments of asymmetric profiles of the space blocks, the angle of inclination ψ can range between 60 to 90 degrees.

The space blocks in the illustrated embodiments can be extruded or molded using conventional manufacturing processes. While the manufacturing costs are slightly higher than the cost for the making conventional space blocks, improved heat transfer increases the generator stator core life as measured by the number of operational hours. Also, it should be noted that reducing the cost over the life of the stator core is important. Thus, optimizing the space block cross section profiles can improve the thermal performance of the stator core increasing the first cost but also advantageously reducing the life cycle cost on the stator core. These finned profiles may also be used advantageously with conventionally arranged straight space blocks if the desired increase in heat transfer can be achieved by changing the cross-sectional shape only.

The present invention contemplates multiple variations of space block configurations which direct cooling gas flow in a nonlinear motion. Any combination of space blocks in a pattern of peaks and valleys with the enhanced convective area profiles is contemplated to be within the scope of the invention. Any such arrangements with the addition of variously shaped vortex generators is also within the purview of the invention.

The present invention can replace the straight inside space block configuration that has been used for several decades for stator cores. In particular, the present invention can be applied to all electrical machines with cooling channels using fluidic materials. This can range from small electric generators and large generators for regional power distribution. In addition to the previously discussed advantages, the present invention increases the cooling capacity at the stator core, reduces hot spots, and increases the generator output rating. The embodiments shown of the present invention can be implemented with conventional assembly methods for generator stator cores.

While the invention has been describes with reference to preferred embodiments, it will be understood by those skilled in the art that various changes may be made and equivalents may be substituted for elements thereof without departing from the scope of the invention. In addition, many modifications may be made to adapt a particular situation or material to the teachings of the invention without departing from the scope thereof. Therefore, it is intended that the invention not be limited to the particular embodiment disclosed, but that the invention will include all embodiments falling within the scope of the appended claims.

What is claimed is:

1. A generator stator core having a radial axis extending from a center thereof, comprising:
   at least two laminations;
   a plurality of space blocks extending radially in the generator stator core, the space blocks being disposed between the laminations forming a ventilation duct between adjacent space blocks for a cooling fluid to flow through, wherein at least one space block includes a wavy longitudinal profile; and wherein the at least one space block has asymmetrical profile defined by a web member including a side surface extending between the laminations for transferring heat to the cooling fluid, said web member further having an axis extending between the laminations, and an angle of inclination measured relative to the axis and at least one of the laminations.

2. The generator stator core of claim 1, wherein the angle of inclination ranges between 60 degrees to 89 degrees.

3. A generator stator core having a radial axis extending from a center thereof, comprising:
- at least two laminations;
- a plurality of space blocks extending radially in the generator stator core, the space blocks being disposed between the laminations forming a ventilation duct between adjacent space blocks for a cooling fluid to flow through, wherein at least one space block includes a wavy longitudinal profile; and a plurality of thermal fins extending from a sidewall of the at least one space block for increasing a convective contact area for heat transfer.

4. The generator stator core of claim 3, further comprising a plurality of vortex generators disposed between the adjacent space blocks.

5. The generator stator core of claim 3, wherein the vortex generators are delta shaped.

6. The generator stator core of claim 3, wherein the vortex generators are wedge shaped.

7. The generator stator core of claim 3, wherein the vortex generators are hemispherical.

8. A generator stator core having a radial axis, comprising:
- at least two laminations being adjacent; and
- at least two space blocks being adjacent and extending on the radial axis in the generator stator core, the space blocks being disposed between the laminations for forming a ventilation duct, wherein at least one space block includes a plurality of thermal fins extending from a side surface of the space block.

9. The generator stator core of claim 8, further comprising the space blocks having a sinusoidal shaped longitudinal profile.

10. The generator stator core of claim 8, further comprising the space blocks having a zigzag shaped longitudinal profile.

11. The generator stator core of claim 8, further comprising a plurality of vortex generators disposed on at least one lamination.

12. The generator stator core of claim 11, wherein the vortex generators are wedge shaped.

13. The generator stator core of claim 11, wherein the vortex generators are hemispherical.

14. The generator stator core of claim 11, wherein the vortex generators are triangular shaped having a leading edge extending from the at least one lamination.

15. The generator stator core of claim 8, wherein the cross-sectional profile of the space blocks are asymmetrical.

16. A space block for forming radially disposed ventilation ducts in a generator stator core, the space block comprising a wavy longitudinal profile for causing local separation and reattachment of a cooling fluid boundary layer along the wavy longitudinal profile; and a sidewall having a plurality of thermal fins for transferring heat to the cooling fluid.

17. A space block for forming radially disposed ventilation ducts in a generator stator core, the space block comprising a wavy longitudinal profile for causing local separation and reattachment of a cooling fluid boundary layer along the wavy longitudinal profile; and the space block including a web member, two opposing flanges being substantially parallel, an axis extending between the flanges, and angle of inclination measured relative to the axis and a lamination surface of the generator stator core, the web member including a side surface extending between the opposing flanges for transferring heat to the boundary layer.

18. A space block for forming radially disposed ventilation ducts in a generator stator core comprising:
- a wavy longitudinal profile for causing local separation and reattachment of a cooling gas boundary layer along the wavy longitudinal profile; and
- a side surface including plurality of thermal extensions for transferring heat to the cooling gas.

19. The space block of claim 18, wherein the wavy longitudinal profile is defined by a sinusoidal shape.

20. The space block of claim 18, wherein the sinusoidal shape is defined by Asin(wx) where A is a predetermined amplitude parameter, w is a predetermined angular frequency, and x is a length dimension in the radial direction of the generator stator core.

21. The space block of claim 18, wherein the wavy longitudinal profile is being defined by zigzag pattern with respect to a radial axis of the generator stator core.

22. A space block for forming a radial cooling gas ventilation duct in a generator stator core, the space block having a side surface including a plurality of thermal extensions for transferring heat to a cooling gas.

23. The space block of claim 22, further comprising a web member, two opposing flanges being substantially parallel, an axis extending between the flanges, an angle of inclination measured relative to the axis and at least one of the opposing flanges, wherein the web member includes the side surface extending between the opposing flanges.

24. The space block of claim 23, wherein the angle of inclination ranges between 60 degrees to 90 degrees.

25. A space block for forming radially disposed ventilation ducts between adjacent laminations in a generator stator core, the space block comprising a web member extending between the adjacent laminations, the web member including a side surface extending between the laminations for transferring heat to a cooling gas, said web member further having an axis extending between the laminations, and an angle of inclination measured relative to the axis and at least one of the adjacent laminations.

* * * * *

UNITED STATES PATENT AND TRADEMARK OFFICE
CERTIFICATE OF CORRECTION

PATENT NO.   : 6,498,408 B2                                   Page 1 of 1
DATED        : December 24, 2002
INVENTOR(S)  : Wei Tong et al.

It is certified that error appears in the above-identified patent and that said Letters Patent is hereby corrected as shown below:

Column 1,
Lines 33 and 64, "strator" has been replaced with -- stator --.

Column 2,
Line 8, "strator" has been replaced with -- stator --.

Column 4,
Line 32, insert -- and -- before the phrase "a trailing edge 44",
Line 66, "illustrates" has been replaced with -- illustrates, --.

Column 5,
Lines 16 and 65, "Ψ" has been replaced with -- φ --.

Column 6,
Line 2, "Ψ" has been replaced with -- φ --.

Signed and Sealed this

Thirteenth Day of May, 2003

JAMES E. ROGAN
*Director of the United States Patent and Trademark Office*